United States Patent
McNally (10) Patent No.: US 10,328,842 B2
(45) Date of Patent: Jun. 25, 2019

(54) CARGO SECURING APPARATUS

(71) Applicant: STELLENBOSCH UNIVERSITY, Stellenbosch (ZA)

(72) Inventor: Leo David McNally, Stellenbosch (ZA)

(73) Assignee: STELLENBOSCH UNIVERSITY, Stellenbosch (ZA)

( * ) Notice: Subject to any disclaimer, the term of this patent is extended or adjusted under 35 U.S.C. 154(b) by 114 days.

(21) Appl. No.: 15/524,561

(22) PCT Filed: Nov. 13, 2015

(86) PCT No.: PCT/IB2015/058779
§ 371 (c)(1),
(2) Date: May 4, 2017

(87) PCT Pub. No.: WO2016/075663
PCT Pub. Date: May 19, 2016

(65) Prior Publication Data
US 2017/0313233 A1    Nov. 2, 2017

(30) Foreign Application Priority Data
Nov. 14, 2014 (ZA) .................. 2014/08325

(51) Int. Cl.
*B60P 7/08* (2006.01)
(52) U.S. Cl.
CPC .......... *B60P 7/0861* (2013.01); *B60P 7/0846* (2013.01); *B60P 7/083* (2013.01)
(58) Field of Classification Search
CPC ...... B60P 7/0861; B60P 7/0083; B60P 7/0846
(Continued)

(56) References Cited

U.S. PATENT DOCUMENTS 7,972,099 B2 * 7/2011 Leggett ................. B60P 7/0861
410/100
8,847,758 B2   9/2014 Eide
(Continued)

FOREIGN PATENT DOCUMENTS

DE   102005010235 A1 *  4/2006  ............ B60P 7/0823
DE   102005010235 A1    4/2006
(Continued)

OTHER PUBLICATIONS

EPO english translation of DE-202012100625-U1 (Year: 2012).*
(Continued)

*Primary Examiner* — Yazan A Soofi
(74) *Attorney, Agent, or Firm* — Greer, Burns & Crain, Ltd.

(57) ABSTRACT

A cargo securing apparatus and a method of maintaining a user configured tension in a cargo securing element are disclosed. The apparatus includes at least one sensor arranged to measure a first and second tension in a tensile element (used to secure the cargo) at different times and a processor in data communication with the sensor. The processor is configured to receive the tension measurements from the sensor and to distinguish between acute and sustained deviations in tension based on the tension measurements. Conditionally, the processor may compare the first and second tension measurements to a user configured tension setting and determine tension correction parameters required to maintain the tension in the tensile element within a range of the user configured setting. The apparatus may include one or more manual or automated adjustment drives to adjust the tension in the tensile element in accordance with the tension correction parameters.

17 Claims, 6 Drawing Sheets

(58) Field of Classification Search
USPC .......................................................... 701/36
See application file for complete search history.

(56) References Cited

U.S. PATENT DOCUMENTS

| | | | | |
|---|---|---|---|---|
| 2010/0158629 | A1* | 6/2010 | Morland | B60P 7/0861 |
| | | | | 410/98 |
| 2013/0162420 | A1* | 6/2013 | Stoddard | B60P 7/0861 |
| | | | | 340/425.5 |
| 2016/0061676 | A1* | 3/2016 | Brown | G01L 5/0033 |
| | | | | 73/862.68 |

FOREIGN PATENT DOCUMENTS

| | | | | |
|---|---|---|---|---|
| DE | 202012100625 U1 * | 6/2012 | ............ | B60P 7/0861 |
| DE | 202012100625 U1 | 8/2012 | | |

OTHER PUBLICATIONS

EPO english translation of DE-102005010235-A1 (Year: 2006).*
International Search Report from International Patent Application No. PCT/IB2015/058779, dated Feb. 22, 2016.
Written Opinion from International Patent Application No. PCT/IB2015/058779, dated Feb. 22, 2016.

* cited by examiner

CARGO SECURING APPARATUS

CROSS-REFERENCE TO RELATED APPLICATIONS

This application claims priority to South African provisional patent application number 2014/08325 filed on 14 Nov. 2014, which is incorporated by reference herein.

BACKGROUND

This invention relates to a cargo securing apparatus. More particularly, this invention relates to an apparatus for use in the securing of cargo during transportation thereof.

Cargo is conventionally transported by means of trucks, ships, aircrafts and other motorised vehicles.

To prevent the cargo from moving around during transportation it is typically secured to the vehicle transporting it by means of tensile elements (also referred to herein as "tensile members"), such as straps, nets, chains or ropes which are tensioned around the cargo as well as to the sides of the loading area or cargo hull of the vehicle.

The cargo, and tensile member(s) securing the cargo to the vehicle, are inevitably exposed to external factors such as cross winds and bumps during transportation. These external factors can cause tension in the tensile elements to change, causing incorrect tensioning in the tensile element(s). Incorrect tensioning in the tensile member(s) can cause the cargo to slip, move or shift during transportation.

When cargo shifts on a truck trailer, for instance, it also shifts the trailer weight distribution which may cause the trailer to become unstable. This can potentially cause the truck to jack-knife or flip over. It is also common for cargo to fall off the vehicle when tension in the tensile elements becomes insufficient.

Another concern is the difficulty of tensioning tensile elements to a desired tension. It is often difficult to manually secure and tension tensile elements to a desired tension. An individual may, for instance, not have sufficient physical strength to secure the tensile elements at a desired tension if the elements are secured manually. Conversely, where lower tensions are required to prevent damage to fragile cargo, an individual may apply too much tension to the tensile elements thereby causing damage to the cargo during transportation.

At present, the above-mentioned problems are addressed by the use of equipment such as anti-slip mats, ratchet straps, cam straps, over-centre levers, cam style straps and winch straps.

The applicant is also aware of a system which sends a signal to a display panel to indicate when a tensile element, such as a strap, is loose.

The preceding discussion of the background to the invention is intended only to facilitate an understanding of the present invention. It should be appreciated that the discussion is not an acknowledgment or admission that any of the material referred to was part of the common general knowledge in the art as at the priority date of the application.

SUMMARY

In accordance with this invention, there is provided a cargo securing apparatus comprising
at least one sensor arranged to measure tension in at least one tensile element; and
a processor in data communication with the at least one sensor configured to receive tension measurements from the at least one sensor,
wherein the at least one sensor is configured to measure a first tension and a second tension in the at least one tensile element at different times, and
wherein the processor is configured to distinguish between acute deviations in tension and sustained deviations in tension based on the first and second tension measurements, and to conditionally compare the first and second tension measurements to a user configured value associated with the at least one tensile element and to determine tension correction parameters required to maintain tension in the at least one tensile element within a range of the user configured value.

Further features provide for the cargo securing apparatus to include at least one motor in communication with the processor, wherein the processor is further configured to send control signals to the at least one motor instructing the at least one motor to adjust tension in the at least one tensile element in accordance with the determined tension correction parameters in order to maintain tension within the range of the user configured value.

A still further feature provides for the at least one motor to be removably securable to the cargo securing apparatus.

Yet further features provide: for the processor to determine an alarm condition based on the tension correction parameters; for the alarm condition to be determined when the tension measured in the at least one tensile element by the at least one sensor does not correspond to the user configured value associated with the at least one tensile element; for the processor to determine the alarm condition when the tension measured in the at least one tensile element by the at least one sensor falls outside the range of the user configured value associated with the at least one tensile element; for the processor to activate the alarm when an alarm condition is determined; and for the processor to deactivate the alarm subsequent to acknowledgement of the alarm condition by an operator.

A further feature provides for the processor to redetermine the alarm condition based on the distinction between acute and sustained deviations in tension.

Yet further features provide for the controller of the cargo securing apparatus to include at least one accelerometer in data communication with the processor; for the processor to be configured to receive acceleration measurements from the at least one accelerometer and determine new tension correction parameters based on the acceleration measurements; and for the processor to be configured to redetermine the alarm condition based on the acceleration measurements.

Still further features provide for the alarm to be visual and/or audible; and for the alarm to be locatable within a cabin of a vehicle transporting the cargo.

An even further feature provides for the at least one sensor to include a load cell connected to a roller, preferably fixed to the load cell through a spacer.

Still further features provide for: the cargo securing apparatus to include a Human Machine Interface (HMI); the HMI to indicate at least one parameter selected form the group of (tension measurements; acceleration measurements; user configured values; and the alarm condition); and the HMI to include a tension configuration input by means of which the user configurable value associated with the at least one tensile element is configured; a mode selector input by means of which the mode of operation of the cargo securing apparatus is selected; and a reset input for acknowledging the alarm condition and for deactivating the alarm.

Yet a further feature provides for the mode of operation of the cargo securing apparatus to be selectable between: a mode wherein the cargo securing apparatus is inactive; a mode wherein the cargo securing apparatus maintains tension in the at least one tensile element automatically; and a mode wherein the tension in the at least one tensile element can be manually altered.

Even further features provide for one or both of the HMI and the processor of the cargo securing apparatus to extend to a remotely accessible software resource; for the remotely accessible software resource to include a remotely accessible web interface; and for the web interface to be implemented by a web server hosted on the cargo securing apparatus and/or for the web interface to be implemented by a central server to which the cargo securing apparatus may periodically post data via an application program interface (API).

A still further feature provides for the cargo securing apparatus to include a hardware interface.

Even further features provide for the apparatus to include a second sensor arranged to measure tension in the tensile element; for the second sensor to be in data communication with the processor; and for the processor to be configured to operate a second motor associated with the tensile element to maintain tension within a range of the user determined value.

In accordance with a second aspect of the invention there is provided a method of maintaining tension in at least one tensile element of a cargo securing apparatus, the method including the steps of:

receiving, at a processor, a first tension measurement and a second tension measurement of the tension in the at least one tensile element measured by at least one sensor at different times;

distinguishing between acute deviations in tension and sustained deviations in tension, based on the first and second tension measurements received from the at least one sensor; and conditionally comparing the tension measurements received from the at least one sensor to a user configured value associated with the at least one tensile element- and determining tension correction parameters required to maintain tension in the at least one tensile element within a range of the user configured value associated with the at least one tensile element.

A further feature of this aspect of the invention provides for the method to include the step of transmitting control signals to at least one motor of the cargo securing apparatus instructing the at least one motor to adjust the tension in the at least one tensile element in accordance with the determined tension correction parameters.

Yet further features of this aspect of the invention provide for the method to include the steps of: determining an alarm condition based on the tension correction parameters; determining the alarm condition when the tension measured in the at least one tensile element by the at least one sensor does not correspond to the user configured value associated with the at least one tensile element; determining the alarm condition when the tension measured in the at least one tensile element by the at least one sensor is outside the range of the user configured value associated with the at least one tensile element; activating an alarm when the alarm condition is determined; and deactivating the alarm subsequent to acknowledgement of the alarm condition.

A further feature of this aspect of the invention provides for the method to include the step of: redetermining the alarm condition based on the distinction between acute and sustained deviations in tension.

Still further features of this aspect of the invention provide for the method to include the steps of: receiving acceleration measurements from at least one accelerometer and determining new tension correction parameters based on the acceleration measurements; and redetermining the alarm condition based on the acceleration measurements.

Yet further features of this aspect of the invention provide for the method to include the steps of: updating the indication components of an HMI to reflect valid parameter values; receiving input at a mode selector of the HMI and subsequently increasing or decreasing the user configured value associated with the at least one tensile element; receiving input at a reset input of the HMI as acknowledgement of the alarm condition and subsequently deactivating the alarm.

An even further feature of this aspect of the invention provides for the method to include the steps of receiving tension measurements from a second sensor; comparing the tension measurements received from the second sensor to the user determined value; and transmitting control signals to a second motor associated with the tensile member to maintain tension within the range of the user determined value.

BRIEF DESCRIPTION OF THE DRAWINGS

The invention will now be described, by way of example only, with reference to the accompanying representations in which.

DETAILED DESCRIPTION

The invention relates to a cargo securing apparatus and a method of maintaining the tension in a tensile element during the transportation of cargo.

Figure 1:
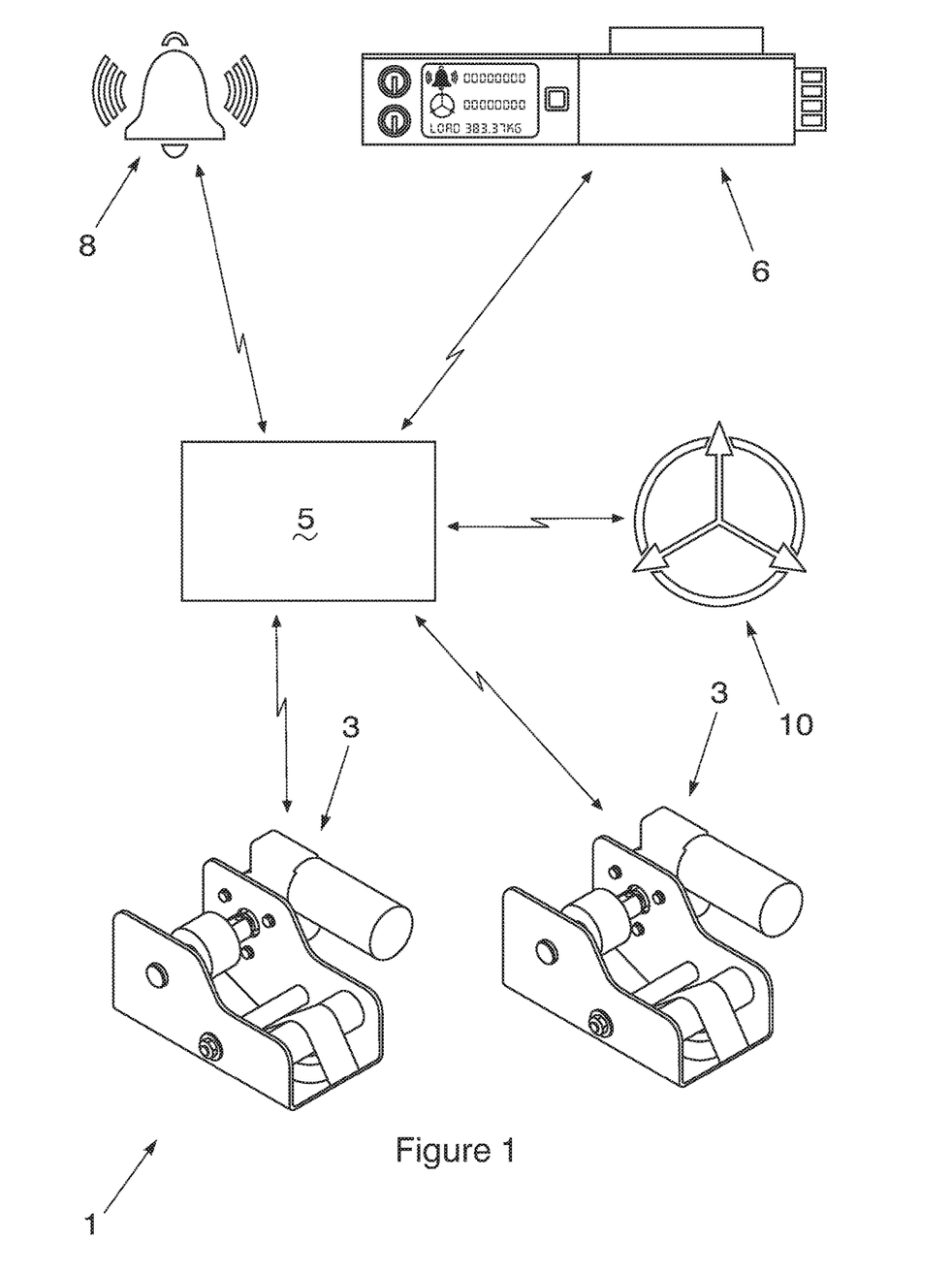
FIG. 1 is a schematic illustration of a cargo securing apparatus according to the disclosure.

FIG. 1 shows a schematic illustration of a cargo securing apparatus (1) as disclosed herein. The apparatus (1) comprises two tensioning units (3), a processor (5), a controller (6) and an alarm (8).

Figure 2:
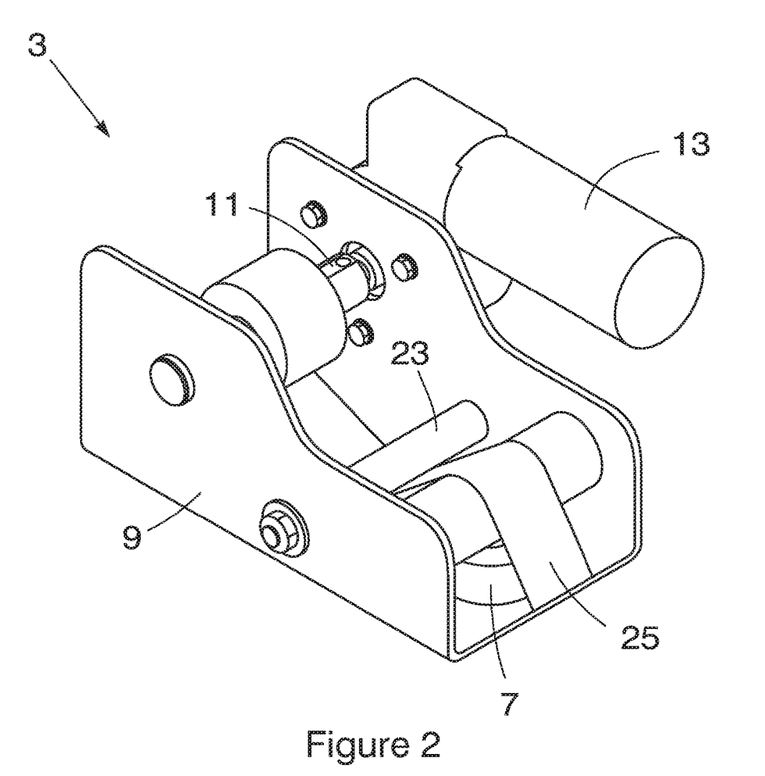
FIG. 2 is a three dimensional view of a tensioning unit of a cargo securing apparatus.

As shown in FIG. 2, each tensioning unit (3) includes a sensor (7) secured to an operatively front end of a channel sectioned support structure (9), and a rotatable shaft (11) secured in the channel section of the support structure (9) opposite the sensor (7) and operated by a motor (13) secured externally of the support structure (9).

Figure 3:
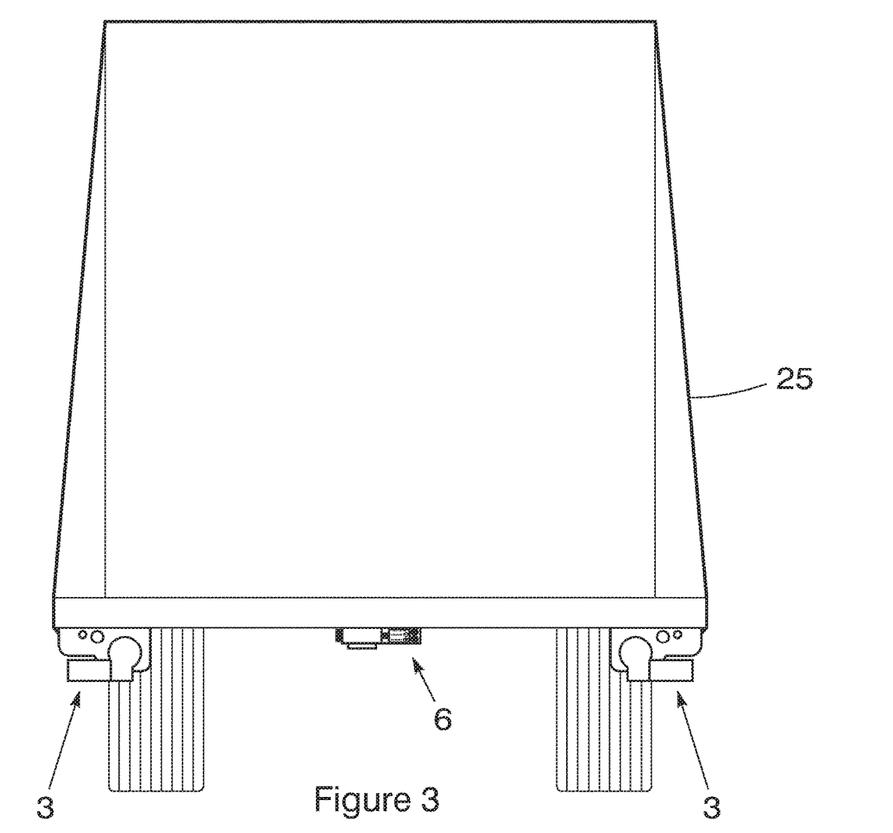
FIG. 3 is a rear view of a truck trailer fitted with a cargo securing apparatus.

In use, a first tensioning unit (3) is secured to one side of a truck trailer and a second tensioning unit (3) to an opposite side of the truck trailer, as shown in more detail in FIG. 3. To secure cargo on the trailer, a user attaches one end of a tensile strap (25) to the rotatable shaft (11) of the first tensioning unit (3), manoeuvres the tensile strap over the cargo, and attaches an opposite end of the tensile strap (25) to the rotatable shaft (11) of the second tensioning unit (3).

The user then determines a desired tension value required to retain the specific cargo to be transported in place. Next, the user configures the controller (6) with the user determined value, as well as threshold limits. When the controller (6) is subsequently set to the appropriate mode, the processer (5) will send control signals to the motor (13) of the tensioning unit (3), thereby activating the rotatable shaft (11) to tension the tensile strap (25) to the user configured tension setting. It will be appreciated that the processor may be in electrical or wireless data communication with the motor. The sensor (7) of the tensioning unit (3) is then activated and from there on continuously measures the tension in the tensile strap and communicates the tension measurements to the processor (5). Upon receipt of the tension measurements, the processor compares the tension measurements received from the sensor to the user configured tension value. As soon as the measured tension corresponds with the user configured value, the processor (5) switches off the motor, deactivating the rotatable shaft (11), thus leaving the tensile strap (25) at the desired tension.

The cargo is now firmly secured to the truck trailer and can be transported to its destination. If tension in the tensile strap (25) changes during transportation, chances are that the cargo may shift, move or slide.

During transportation, the first sensor (7) of the first tensioning unit (3) and the second sensor (7) of the second tensioning unit (3) intermittently measure tension in the tensile strap (25) while communicating the tension measurements to the processor (5). Upon receipt of the tension measurements, the processor (5) compares the tension measurements received from the first and second sensors (7) to the user configured value, and, if they the measured tension in the strap differs from the user configured value to a significant extent, determines a set of tension correction parameters.

These tension correction parameters may include which motor(s) (13) to activate, the direction in which the motor(s) (13) should be activated, the power with which the motor(s) (13) should be activated and the length of time the motor(s) (13) should be activated for. Consequently, the first and/or second motor (13) is activated in accordance with the determined tension correction parameters. If, for example, the tension measurements received from the first sensor (7) indicate a deviation from the user determined value, the tension correction parameters will indicate that only the first motor (13) should be activated. Conversely, if the tension measurements received from the second sensor (7) indicate a deviation from the user determined value, the tension correction parameters will indicate that only the second motor (13) should be activated. Consequently, should tension measurements from both sensors (7) indicate tension deviation from the user determined value, the tension correction parameters will indicate that the first motor (13) and the second motor (13) should be activated in order to rectify the tension. Each motor (13) will then activate the rotatable shaft (11) of the respective tensioning units (3) so as to increase or decrease tension in the tensile strap (25) in accordance with the correction parameters, thereby maintaining tension in the tensile straps (25) within a range of the user determined value, and typically within the threshold limits.

It is, of course, possible that the tension exceeds the user determined or configured threshold in one portion of the tensile strap (25), while tension in a second portion of the tensile strap (25) is insufficient. This can occur because of friction between a tensile strap (25) and the cargo, the shape of the cargo being transported or movement of the cargo in a specific direction. In such instances, the tension correction parameters will indicate that the tension in the tensile strap (25) should be increased at one tensioning unit (3) while tension in the tensile strap (25) should be decreased or maintained at the second tensioning unit (3).

Rotation of the rotatable shaft (11) in a first direction will increase the tension in the tensile strap (25), while rotation of the rotatable shaft (11) in an opposite direction will decrease the tension in the tensile strap (25). In a preferred embodiment, the cargo securing apparatus (1) is configured such that the processor (5) will only activate a motor (13) if tension measurements received from a sensor (7) exceed user specified thresholds.

The processor (5) may be configured to only generate an alarm condition when tension measurements from either of the sensors (7) exceed the user specified thresholds and will subsequently activate the alarm (8). The alarm (8) is typically located within a cabin of the truck and it may be audible, visual or both.

The controller (6) is typically contained in a controller box (29) and may be located outside the cabin of the truck, which may compel a driver to pull over to the side of the road in order to acknowledge the alarm condition after which the processor (5) will deactivate the alarm (8). This may compel the driver to inspect the cargo to determine the reason for shifting, moving or slipping of the cargo while at the same time preventing further damage to the cargo that may occur while the vehicle is moving.

In a preferred embodiment, the processor (5) is configured to distinguish acute tension deviations in the tensile strap (25) from sustained tension deviations, based on tension measurements received from the sensors (7). For instance, one of the sensors (7) may communicate a first tension measurement to the processor (5) exceeding the user determined thresholds. Then, after a predetermined time period has passed, the same sensor (7) may communicate a second tension measurement to the processor (5) falling within user determined thresholds. The processor (5) may then classify the first measurement as originating from an acute or temporary tension deviation and may not activate the motor (13) or generate an alarm condition. Accordingly, the processor (5) will also not activate the alarm (8).

Conversely, if both the first and second tension measurements exceed or otherwise fall outside the user specified thresholds, the processor (5) may classify the deviations as a sustained tension deviation and accordingly transmit control signals to the motor (13) causing it to be activated, thereby activating the rotatable shaft (11) of the tensioning unit (3). The processor (5) may then also generate an alarm condition and subsequently activate the alarm, making the driver aware of the change in tension.

This aspect of the invention is particularly useful as it is almost inevitable that acute deviations in tension will occur during transportation and the ability of the cargo securing apparatus (1) to distinguish acute tension deviations from sustained tension deviations will reduce false alarms and unnecessary activation of the motors and associated tension adjustments during transportation. The truck could, for instance, hit a bump in the road which may cause an acute tension deviation. It should be appreciated that the invention is not limited to trucks and this aspect of the invention will be equally useful in the case of an airplane experiencing turbulence or a ship being affected by adverse weather conditions.

It is also foreseen that the cargo securing apparatus may be equipped with an accelerometer (10) that communicates acceleration measurements to the processor (5). The processor (5) may use these supplementary acceleration measurements to classify the tension deviations as either acute deviations or sustained deviations with a greater degree of certainty. Accelerometer measurements may also be used to indicate, derive or calculate a plethora of additional or alternative information regarding the cargo in transit. Such information may, for example, include navigational information, accident identification information, driving behaviour information and vehicle roll information to name but a few.

It is appreciated that the cargo securing apparatus (1) may only have one tensioning unit (3) in which case the processor (5) may be in communication with one or more sensors (7), one motor (13) and optionally an accelerometer (10). One end of the tensile strap (25) may, for instance, be attached to an attachment formation secured to the body of the truck, while the other end of the tensile strap (25) may be attached to the tensioning unit (3) of the apparatus on the other side of the truck.

It is also foreseen that the cargo securing apparatus (1) may include multiple tensioning units (3), in which case the processor (5) of the cargo securing apparatus (1) may be configured to communicate with multiple sensors (7), multiple motors (13) and, optionally, an accelerometer (10). This would enable the driver to use multiple tensile straps (25) to retain cargo in place, all being monitored from a central processor. This may in turn reduce hardware costs.

Figure 5:
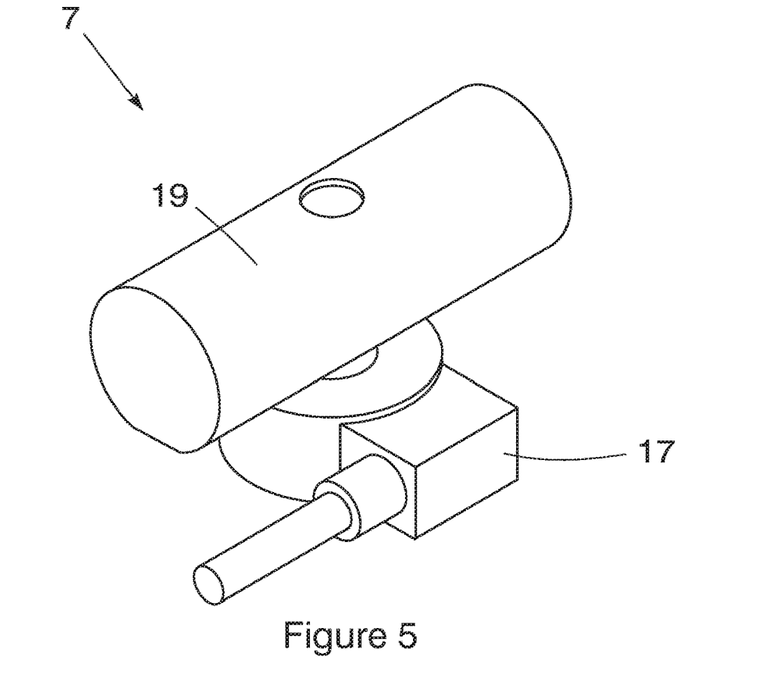
FIG. 5 is a three dimensional view of a first embodiment of a sensor of a cargo securing apparatus.
Figure 6:
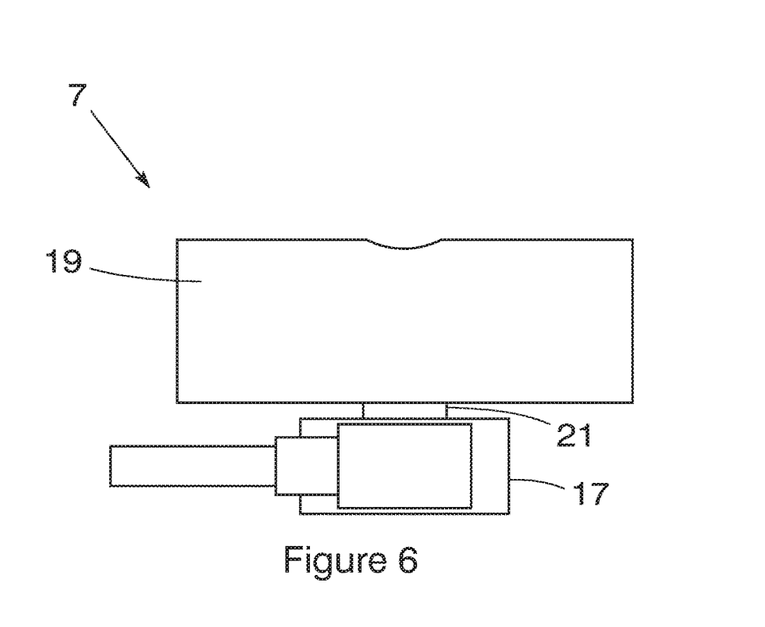
FIG. 6 is a side view of the sensor shown in FIG. 5.

The sensor may be a load cell (17) as shown in FIGS. 5 and 6. The load cell (17) may be connected to a roller (19) fixed through a spacer (21). The load cell may be mounted to a front end of the channel sectioned support structure of the tensioning unit. In one embodiment, shown in FIG. 2, a free roller (23) may be mounted to the support structure (9). The free roller (23) is preferably positioned between the sensor (7) and the rotatable shaft (11). In use, the user will introduce one end of the tensile strap (25) into the support structure (9) and over the sensor (7). The end is then maneuverer underneath the free roller (23) and attached to the rotatable shaft (11) of the motor (13).

It will be appreciated that the load cell (17) could be replaced with any transducer suitable for the measurement of force, whether this is tensile force or compressive force. The load cell is therefore not limited to a particular type of load cell. It may be a strain gauge load cell comprising any internal configuration or a piezoelectric load cell. Many well-known varieties of strain gauges are commonly used, such as beam types, S types, canister or column types, diaphragm or pancake types to name but a few.

The support structure (9) may include one or more free rollers (23) that would serve to reduce frictional forces exerted on the tensile strap (25). This may increase the lifespan of the tensile strap (25) as the strap will experience less wear and tear due to decreased friction.

As mentioned earlier in this specification, the controller box (29) is preferably fixed at a location close to the loading area or cargo hull but outside the operator's cabin so as to urge the driver to inspect the cargo when the alarm (8) has been activated.

The cargo securing apparatus (1) may furthermore be equipped with a Human Machine Interface (HMI) to indicate relevant information such as tension measurements or alarm conditions and a means of input to modify configurations on the apparatus. The HMI may comprise a combination of indication and input components physically located on the apparatus. Such indication components may include liquid crystal displays, 7-segment LED displays, discrete LED's or a combination thereof, however, this list is not exhaustive. Similarly, the input components may include tactile switches, membrane switches, selector switches, capacitive or resistive touch inputs or a combination thereof, however, this list is also not exhaustive.

Figure 4:
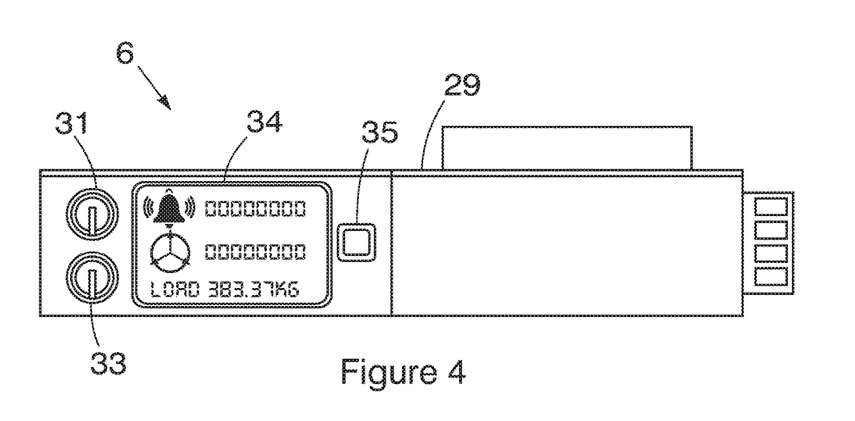
FIG. 4 is a schematic illustration of a controller box of the cargo securing apparatus.

FIG. 4 shows the realisation of the HMI in the exemplary embodiment to comprise a mode selector input (31) as a mechanical switch, a tension configuration input (33) as a mechanical switch, an indicator panel (34) comprising various electronic gauges, LED's and other indicators and an alarm reset button (35) as a mechanical push button, all physically located on the controller box (29). The mode selector (31) allows the user to either power down the apparatus by setting it to the "off" position; manually adjust tension in the tensile strap by setting the mode selector (31) to the "release" position; or setting the mode selector (31) to the "tension" position in which mode it will automatically maintain a user configured tension in the tensile strap (25). In order to reset the alarm the user may, for instance, have to push the alarm reset button (35) and hold it down for a predetermined period of time.

The HMI may also be realised in the form of a remotely accessible software resource, such as a web interface. It is envisaged that such a web interface may be accessible from a web browser on a remote machine accessing a web server hosted on the cargo securing apparatus (1). The HMI may also be realised in the form of a mobile application wherein the mobile device on which the mobile application is accessed is in communication with the cargo securing apparatus (1) via a wireless communication channel, such as Bluetooth, WiFi, Near Field Communication (NFC) or GPRS, for example.

Alternatively, the cargo securing apparatus (1) may periodically post data, including tension measurements, acceleration measurements, alarm conditions, and the like, to a central server via an API. The central server may store the data in an appropriate data repository. A user or operator may then access a web interface, hosted on this central server that can retrieve the stored data from the data repository and display the data to the user via the web interface. It will be appreciated by those skilled in the art that many different network topologies and data collection strategies may be used to achieve the required result, for example, remotely accessing the data associated with the cargo securing apparatus from a web interface.

The cargo securing apparatus may furthermore be equipped with a hardware interface. This hardware interface may comprise discreet inputs by means of which the apparatus may be given control signals such as a reset signal; discreet outputs by means of which the apparatus may indicate various conditions, such as an alarm condition; a communication protocol interface, such as RS-232, Universal Serial Bus (USB), Serial Peripheral Interface (SPI), Controller Area Network bus (CAN bus) and the like, through which bi-directional communication may be realised between the cargo securing apparatus and another device; or any combination of the aforementioned.

It will be appreciated that the aforementioned interfaces will facilitate the integration of the cargo securing apparatus into existing fleet management systems. It is envisaged that the fleet management system may query the cargo securing apparatus for tension measurements, acceleration measurements, alarm conditions and the like. Alternatively, the cargo securing apparatus may be configured to alert the fleet management system via these interfaces in the event of any conditions that may be of interest to the fleet management system, after which an exchange of data between the cargo securing apparatus or vehicle operator and fleet management system or operator may take place.

Figure 7A:
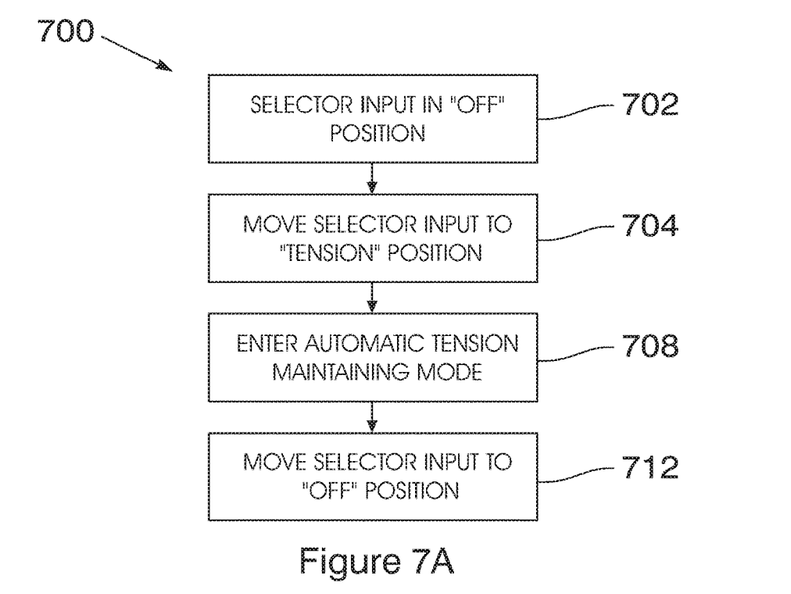
FIG. 7A is a flow diagram illustrating a method of setting a cargo securing apparatus to an automatic mode.
Figure 7B:
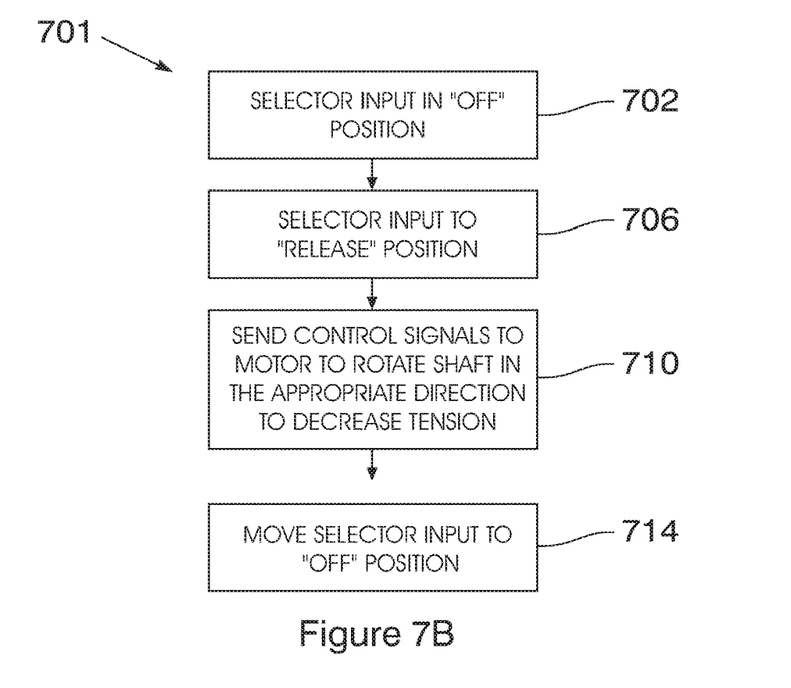
FIG. 7B is a flow diagram illustrating a method of manually reducing the tension in a tensile element of a cargo securing apparatus.

FIGS. 7A and 7B show flow diagrams indicating methods of selecting the mode of operation of the cargo securing apparatus (1). FIG. 7A shows method steps for selecting an automatic tension maintaining mode and FIG. 7B shows method steps for selecting a At an initial stage (702), the mode selector input (31) will typically be set to the "off" position prior to any operation of the apparatus.

As shown in FIG. 7A, the operator can set the mode selector input (31) to the "tension" position at step (704). It should be appreciated, however, that prior to entering the tension setting at step (704), the operator configures the cargo securing apparatus (1) by setting an appropriate tension setting on the tension configuration input (33) as well as upper and lower tension deviation threshold limits. Subsequently, upon setting the selector input (31) to the "tension" position at step (704), the apparatus will enter an automatically tension maintaining mode at step (708), in which it will automatically maintain the tension in the straps (25) to the user configured tension and correct deviations therefrom. This mode will subsequently be discussed in greater detail.

FIG. 7B shows the mode selector input (31) alternatively being set to the "release" position at step (706). When in the release position the processor (5) will send control signals to the motor (13) to rotate the rotatable shaft (11) in the appropriate direction to decrease the tension in the strap at step (710). This may be required in order to remove the straps (25) from the cargo before offloading or in order to make corrections to the positioning of the straps (25). The processor (5) will continue to send these control signals to the motor (13), which in turn will continue to rotate its rotatable shaft (11) and thereby decreasing the tension in the straps (25) until such time as the operator again selects the "off" position at step (714) of the mode selector input (31).

Figure 8:
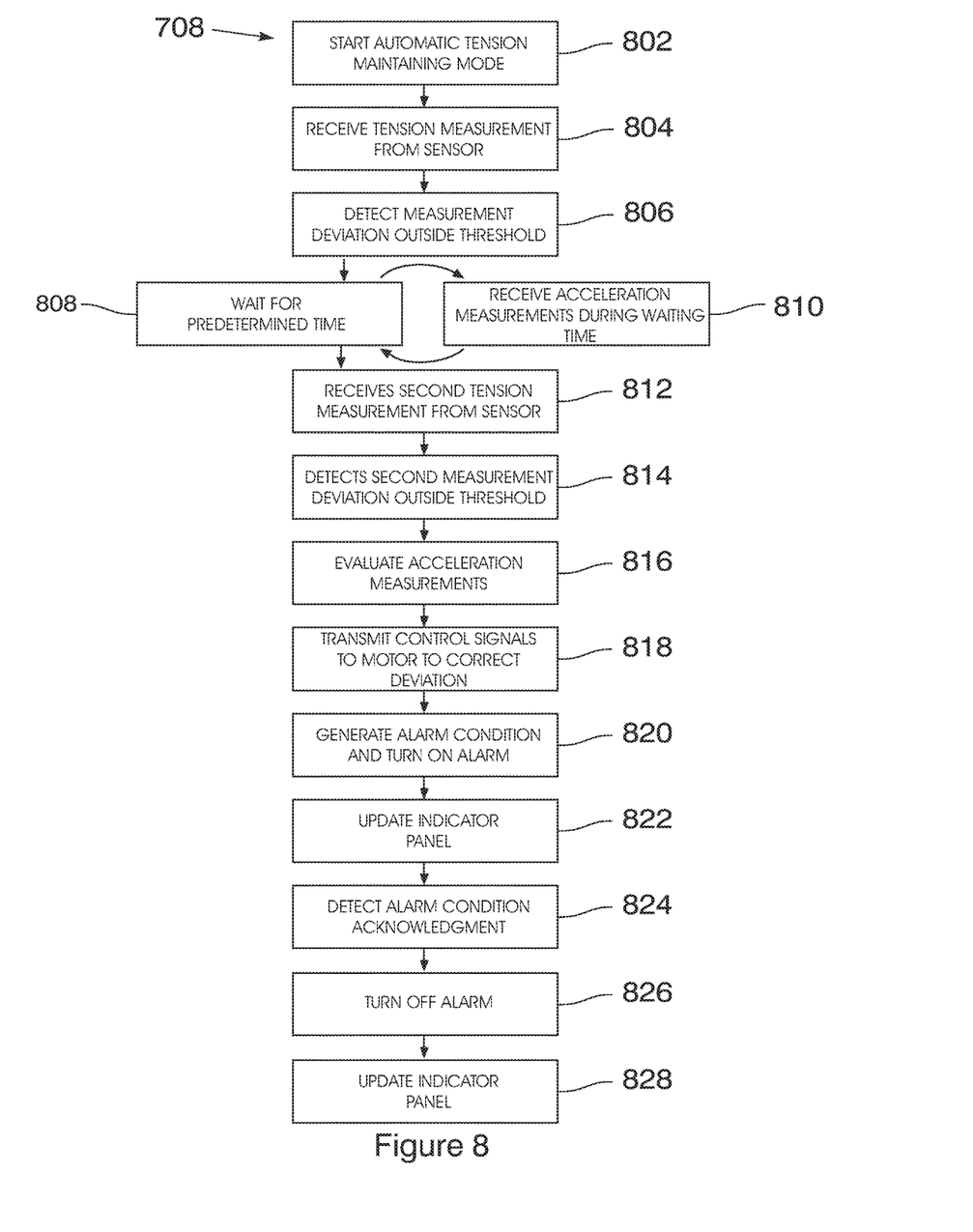
FIG. 8 is a flow diagram illustrating a method of maintaining tension in a tensile element of a cargo securing element according to the disclosure.

FIG. 8 shows the automatic tension maintaining mode (708) described above, in greater detail. In this mode, the cargo securing apparatus (1) will automatically tension the strap (25) to the user configured tension value and correct deviations therefrom if so required.

After entering this mode at step (802), the processor (5) sends control signals to the motor (13) to rotate its rotatable shaft (11) in the appropriate direction in order to perform an initial tensioning of the strap (25) to the user configured tension value. Thereafter, the processor (5) receives tension measurements of the tension in the tensile strap (25) measured by the sensor (7) of a tensioning unit (3) at step (804).

The processor (5) then compares the tension measurements to the user configured tension value, as well as to the user configured tension deviation threshold limits and will detect at step (806) whether the tension measurements deviate outside the limits set by the lower and upper deviation threshold limits (from the user configured tension).

At step (808), the processor (5) then waits a predetermined time during which time it receives acceleration measurements from the accelerometer (10) at step (810). After the aforementioned time has lapsed, the processor (5) receives a second tension measurement at step (812) from the sensor (7), comparing each of the tension measurements to the user determined value, as well as to the user determined threshold limits The processor (5) then determines at step (814) whether the second tension measurements from the sensor exceeds or otherwise falls outside the user determined threshold limit. Based on the first and second tension measurements, the processor (5) may distinguish between acute deviations in tension and sustained deviation in tension. If either the first tension measurement or the second tension measurement falls within the user determined threshold limits, the processor (5) will classify the tension deviation as acute and will not transmit control signals to a motor (13) of the cargo securing apparatus (1) and the tension of the tensile strap (25) will therefore not be adjusted.

If, however, both the first tension measurement and the second tension measurement are lower than the lower user determined threshold limit, the processor (5) may classify the deviation as sustained, which will necessitate a correction by increasing the tension in the strap (25).

If, conversely, both the first tension measurement and the second tension measurement exceed the upper user determined threshold limit, the processor (5) may also classify the deviation as sustained, which will necessitate a correction by decreasing the tension in the strap (25).

The acceleration measurements during the time between the first and second tension measurements may provide additional information indicating that the tension deviations are of a sustained or alternatively of an acute nature. Subsequently, the processor (5) will evaluate at step (816) these acceleration measurements and may use this information to either confirm the need for a correction in the tension in the strap (25) or, alternatively, to refrain from taking action allowing the temporary condition to pass.

Should a correction in tension be required, and the requirement be to increase the tension in the strap (25), the processor (5) will transmit control signals at step (818) to the motor (13) of the cargo securing apparatus (1) instructing the motor (13) to rotate the rotatable shaft (11), to which one end of the tensile strap (25) is attached, in a first direction to increase tension in the tensile strap (25).

If conversely, a correction in tension be required, and the requirement be to decrease the tension in the strap (25), the processor (5) will transmit control signals to the motor (13) of the cargo securing apparatus (1) at step (818), instructing the motor (13) to rotate the rotatable shaft (11), to which one end of the tensile strap (25) is attached, in a second direction to decrease tension in the tensile strap.

It should be appreciated that, during steps (804) to (816), the processor (5) may also depend entirely on the tension measurements from the sensor (7) or alternatively depend entirely on the acceleration measurements from the accelerometer (10) in order to make a decision as to the need to take action regarding tension adjustments in the strap (25).

If a tension correction was required, the processor (5) will generate an alarm condition at step (820) and subsequently activate the alarm (8). The processor (5) will also update the indicators on the indication panel (34) at step (822) in order to reflect the appropriate alarm condition.

The alarm (8) will remain active until such time as the process (5) detects an acknowledgement of the alarm condition at step (824). This may require the operator of the vehicle to activate the alarm reset button (35) for a predetermined time. The processor will, upon detecting the acknowledgement of the alarm condition at step (824), deactivate the alarm and subsequently update the indicators on the indication panel (34) accordingly at step (828).

The applicant conducted several experiments in order to determine a practical and cost effective way of manufacturing the cargo securing apparatus. During these experiments, various different materials were used for the sensor, processor and motor. A selection of such experiments are discussed in more detail in what follows. It should, however, be appreciated that these experiments are exemplary and that the invention is not limited to the materials or components used therein.

A Wagezelle U2A load cell was selected as the sensor of choice for these experiments. A Wagezelle U2A load cell is a six wire tension/compression load cell which is less sensitive to side loading, a measurement disturbing factor associated with load cells. As the output signal from the load cell is small and the processor used during experimentation has an analog input voltage range between 0V and 5V, a voltage amplifier was used to amplify the output signal of the load cell in order to optimise the measurement resolution. The INA125PA instrumentation amplifier was used in this experiment as it is compact in size, low cost, accurate, robust and has a wide operating voltage.

An Arduino Mega 2560 R3 was used as the processor as it is relatively inexpensive, small in size and has all the functions and peripherals needed to optimally control the cargo securing apparatus. The Arduino Mega 2560 R3 can also operate from a DC voltage supply, such as a battery, and has an operational voltage of between 6V and 20V. This means the Arduino Mega 2560 R3 can be operated from the 12V voltage supply typically available from the battery on board a truck.

The Arduino Mega 2560 R3 measures the amplified output signal from the load cell through an analogue input pin on the processor. The Arduino Mega 2560 R3 features a 16 channel, 10-bit analogue to digital converter (ADC). This means it can map input voltages between 0V and 5V to integer values between 0 and 1023. This yields a resolution between readings of 5V/1024 units, or 4.9 mV per unit. During experimentation, a 1 ton Wagezelle load cell with sensitivity of 2 mV/V was chosen. Therefore, the Arduino Mega 2560 R3, in combination with the INA125PA amplifier, was able to measure changes in tension of 0.976 kg. This is a sufficient resolution to measure the large changes in tension to be expected when cargo slips or moves. The appropriate values for the amplifier's gain and the external resistor used to set the gain of the amplifier were determined using the equations below taken from the INA125PA technical datasheet. Therein, G is the amplifier gain; $R_G$ is the resistance value, in Ohm, of the external resistor that is connected to the amplifier in order to set its gain; $V^+_{IN}$ and $V^-_{IN}$ are the differential voltage input values to the amplifier and $V_O$ is the amplifier output voltage.

$$G = 4 + \frac{60\ k\Omega}{R_G}$$

$$V_o = (V^+_{IN} - V^-_{IN})G$$

For experimental purposes, a potentiometer was used as external resistor. For $R_G$=30, the gain G is ±2000 which results in an output voltage range between 88.2 mV and 5V, being within the analogue input voltage range of the Arduino Mega 2560 R3 analogue input.

In order to control the tension in a tensile strap, it is a requirement that the motor should be bi-directional to be able to either increase or decrease the tension as may be required. For this purpose, a DC window wiper motor was used for the experiment.

The Arduino Mega 2560 R3 can supply a maximum of 30 mA at 5V from its Pulse Width Modulation (PWM) outputs and the DC window wiper motor requires 18 A at 24V to run the motor at maximum torque. Therefore the Arduino Mega 2560 R3 could not supply the required power directly. The use of a sufficiently powerful motor driver or relays, for example, were therefore required to meet the power requirements of the motor. These two options are discussed below.

In one experiment, two relays were used to control the motor by completing its 24V power supply circuit, appropriately polarised for the required direction of the motor. The Arduino Mega 2560 R3 PWM output was used to supply the required 5V energising voltage to the appropriate relay coil Some of the advantages of using relays are that they are small in size, easy to install and easy to control. They can, however, not be used to vary the speed of the motor unless a different relay is used for each desired speed setting.

In a subsequent experiment, motor drivers were used for motor control. Motor drivers are electronic components that are used to drive an electric motor by converting low-current control signals into the supply currents required to power the motor. Both the speed and direction of the motor can be controlled by applying the appropriate control signals to the motor driver.

An expansion board for the Arduino range of microcontroller kits, the so-called "motor driving shield", provides a motor driver solution for use with the Arduino Mega 2560 R3 used in this experiment. It controls the speed of the motor by varying the pulse width per period of the PWM output of the motor driver according to the corresponding PWM control signal applied to its control signal inputs. This controls the average voltage applied to the terminals of the DC motor, thereby controlling its speed. The direction of the motor is controlled by applying the appropriate digital control signals to the direction control inputs of the motor driving shield.

Some of the advantages of using a motor driving shield are that they are small in size, easy to install, easy to control and can vary the speed of the motor. They are furthermore robust, most can survive high input voltages, have protection features such as under voltage and overvoltage shutdown and high-side and low-side thermal shutdown.

The Pololu VNH5019 Dual Motor Driving Shield was selected as the motor driver for this experiment, as it has a comparable cost to the costs associated with the alternative relay solution and is able to provide the required motor control necessary to implement accurate tension control in the cargo securing apparatus. It furthermore features two motor driver channels allowing the simultaneous control of two motors.

During final testing, the cargo securing apparatus was set up and tests were conducted in order to:
  determine if the cargo securing apparatus tensions the tensile strap to the user determined value;
  increase the tension out of the upper threshold limit and check that the cargo securing apparatus generates an alarm condition and activates the alarm to warn the driver;
  decrease the tension out of the lower threshold limit and check that that the cargo securing apparatus generates an alarm condition and activates the alarm to warn the driver; and
  apply a force impulse to the tensile strap to simulate the truck hitting a bump and verify that the acute deviation in the tension of the tensile strap does not generate an alarm condition or adjust the tension in the strap.

The tension selector on the controller was set to a user desired tension and a 10 kg weight was attached to the strap. Thereafter, the mode selector was set to "tension" in which mode the apparatus should automatically tension the strap to the user configured value. The apparatus activated the motor as required in order to automatically tension the strap to the user configured value and maintained this tension in the tensile strap.

As a next step, the controller was configured with a desired strap tension and a threshold limit of 5 kg above and below the desired tension. The strap tension was increased by applying an external 5 kg weight which caused the strap tension to exceed the upper threshold. The processor subsequently generated an alarm condition, activated the alarm and the cargo securing apparatus decreased the tension in the strap accordingly. The alarm condition was acknowledged by pressing the alarm reset button and the processor deactivated the alarm.

Conversely, an external 5 kg weight was removed from the tensile strap to decrease the strap tension below the lower threshold. The alarm was also subsequently activated and the cargo securing apparatus tensioned the strap back to the user desired tension.

To simulate a truck hitting a bump and changing the tension in a tensile strap for a short while, the tensile strap was tensioned to a user desired tension and an impulse exceeding the threshold limit was momentarily applied to the tensile strap. The cargo securing apparatus detected the tension deviation, paused for 1.5 seconds and repeated the measurement at which time the tension had already returned to the user desired tension. Consequently no alarm condition was generated nor was the motor activated.

Throughout the specification and claims unless the contents requires otherwise the word 'comprise' or variations such as 'comprises' or 'comprising' will be understood to imply the inclusion of a stated integer or group of integers but not the exclusion of any other integer or group of integers.

The embodiments described herein and any experimental data are for exemplary purposes only and is not intended to delineate the scope of the invention, which is defined by the following set of claims.

The invention claimed is:

1. A cargo securing apparatus comprising:
   at least one sensor arranged to measure tension in at least one tensile element; and
   a processor in data communication with the at least one sensor configured to receive tension measurements from the at least one sensor,
   wherein the at least one sensor is configured to measure a first tension and a second tension in the at least one tensile element at different times and,
   wherein the processor is configured to distinguish between acute deviations in tension and sustained deviations in tension based on the first and second tension measurements, and to conditionally compare the first and second tension measurements from the at least one sensor to a user configured value associated with the at least one tensile element and to determine tension correction parameters required to maintain tension in the at least one tensile element within a range of the user configured value.

2. The cargo securing apparatus according to claim 1, which further includes at least one motor in communication with the processor, wherein the processor is further configured to send control signals to the at least one motor instructing the at least one motor to adjust tension in the at least one tensile element in accordance with the determined tension correction parameters in order to maintain tension within the range of the user configured value.

3. The cargo securing apparatus according to claim 2, wherein the at least one motor is removably secured to the cargo securing apparatus.

4. The cargo securing apparatus according to claim 1, where in the processor is further configured to determine an alarm condition based on the tension correction parameters, the alarm condition being determined when the tension measured in the at least one tensile element by the at least one sensor does not correspond to the user configured value associated with the at least one tensile element or when the tension measured in the at least one tensile element by the at least one sensor falls outside the range of the user configured value associated with the at least one tensile element.

5. The cargo securing apparatus according to claim 4, wherein the processor activates an alarm when the alarm condition is determined.

6. The cargo securing apparatus according to claim 5, wherein the alarm is configured to be deactivated subsequent to acknowledgement of the alarm condition by a user.

7. The cargo securing apparatus according to claim 4, wherein the processor is configured to redetermine the alarm condition based on the distinction between the acute and sustained deviations in tension.

8. The cargo securing apparatus according to claim 4, wherein the controller includes at least one accelerometer in data communication with the processor, and the processor is configured to receive acceleration measurements from the at least one accelerometer and determine new tension correction parameters and alarm conditions based on the acceleration measurements.

9. The cargo securing apparatus according to claim 4, wherein the alarm is a user perceivable alarm located within a cabin of a vehicle transporting the cargo.

10. The cargo securing apparatus according to claim 4, which includes a Human Machine Interface (HMI) configured to display at least one parameter selected form the group comprising tension measurements, acceleration measurements, user configured values and the alarm condition, and which includes a tension configuration input by means of which the user configurable value associated with the at least one tensile element is configured, a mode selector input by means of which the mode of operation of the cargo securing apparatus is selected and a reset input for acknowledging the alarm condition and deactivating the alarm.

11. The cargo securing apparatus according to claim 1, wherein a mode of operation of the apparatus is selectable between an inactive mode, a mode wherein the cargo securing apparatus maintains tension in the at least one tensile element automatically and a mode wherein the tension in the at least one tensile element can be manually altered.

12. A method of maintaining tension in at least one tensile element of a cargo securing apparatus, the method including the steps of:
   receiving, at a processor, a first tension measurement and a second tension measurement of the tension in at least one tensile element measured by at least one sensor at different times;

distinguishing between acute deviations in tension and sustained deviations in tension, based on the first and second tension measurements received from the at least one sensor; and conditionally comparing, by the processor, the tension measurements received from the at least one sensor to a user configured value associated with the at least one tensile element and determining, by the processor, tension correction parameters required to maintain tension in the at least one tensile element within a range of the user configured value associated with the at least one tensile element.

13. The method according to claim 12, further including the step of transmitting control signals to at least one motor of the cargo securing apparatus instructing the at least one motor to adjust the tension in the at least one tensile element in accordance with the determined tension correction parameters.

14. The method according to claim 13, further including one or more of the steps of: determining an alarm condition based on the tension correction parameters; determining the alarm condition when the tension measured in the at least one tensile element by the at least one sensor does not correspond to the user configured value associated with the at least one tensile element; determining the alarm condition when the tension measured in the at least one tensile element by the at least one sensor is outside the range of the user configured value associated with the at least one tensile element; activating an alarm when the alarm condition is determined; and deactivating the alarm subsequent to acknowledgement of the alarm condition by a user.

15. The method according to claim 14, further including the step of: redetermining the alarm condition based on the distinction between acute and sustained deviations in tension.

16. The method according to claim 14, further including the steps of: receiving acceleration measurements from at least one accelerometer and determining new tension correction parameters based on the acceleration measurements; and redetermining the alarm condition based on the acceleration measurements.

17. The method according to claim 14, further including one or more of the steps of: updating an indication components of an HMI to reflect valid parameter values; receiving input at a mode selector of the HMI and subsequently increasing or decreasing the user configured value associated with the at least one tensile element; and receiving input at a reset input of the HMI as acknowledgement of the alarm condition and subsequently deactivating the alarm.

* * * * *